United States Patent
Einthoven et al.

(10) Patent No.: US 6,679,458 B2
(45) Date of Patent: Jan. 20, 2004

(54) SPLIT DETENT TACTILE CUEING VEHICLE CONTROL SYSTEM

(75) Inventors: Pieter G. Einthoven, West Chester, PA (US); David G. Miller, Mount Laurel, NJ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/166,796

(22) Filed: Jun. 10, 2002

(65) Prior Publication Data

US 2003/0226937 A1 Dec. 11, 2003

(51) Int. Cl.[7] .............................................. B64C 13/46
(52) U.S. Cl. ........................ 244/223; 318/685; 318/628
(58) Field of Search ................................ 244/223, 236, 244/228; 318/685, 696, 628

(56) References Cited

U.S. PATENT DOCUMENTS

| 4,516,063 A | * | 5/1985 | Kaye et al. |
| 4,607,202 A | * | 8/1986 | Koenig |
| 4,664,346 A | * | 5/1987 | Koenig |
| 4,717,098 A | * | 1/1988 | Walker et al. |
| 5,347,204 A | * | 9/1994 | Gregory et al. |
| 5,428,543 A | * | 6/1995 | Gold et al. |
| 5,746,398 A | * | 5/1998 | Rollet et al. |
| 6,128,554 A | * | 10/2000 | Damotte |
| 6,145,428 A | * | 11/2000 | Gold et al. |

FOREIGN PATENT DOCUMENTS

GB                947619         *   1/1964   .................. 244/223

* cited by examiner

Primary Examiner—Tien Dinh
(74) Attorney, Agent, or Firm—David J. Clement

(57) ABSTRACT

A split detent tactile cueing vehicle control system (10) for a vehicle (11) is provided including an active control inceptor system (12). The active system (12) includes a control inceptor (22) having a plurality of positions and a position sensor (42) that generates a control inceptor position signal. The tactile cueing system (10) also includes a plurality of vehicle performance sensors that generate a plurality of vehicle performance signals. A flight controller (20) is electrically coupled to the position sensor (42) and the plurality of vehicle performance sensors, and generates a control inceptor actuation signal by applying a tactile cueing model having a split detent and in response to the position signal and the plurality of vehicle performance signals. A method of performing the same is also provided.

20 Claims, 3 Drawing Sheets

SPLIT DETENT TACTILE CUEING VEHICLE CONTROL SYSTEM

TECHNICAL FIELD

The present invention relates generally to aeronautical vehicle systems, and more particularly, to a method and system for tactile cueing a vehicle operator as to a control inceptor position in response to vehicle states.

BACKGROUND OF THE INVENTION

In an aeronautical vehicle, such as a helicopter, a vehicle operator uses control inceptors to control the vehicle. With traditional aircraft, the vehicle operator must continuously adjust the control inceptors positioning to maintain desired vehicle states, such as vertical velocity, airspeed, and others known in the art.

The control inceptors may be part of an active control inceptor system, which emulates mechanical components such as springs and friction clutches that are actuated by an electric motor or other actuation device known in the art. The actuation device is typically controlled via an active controller, to provide tactile cues to the vehicle operator. The tactile cues consist of varying tension on a control inceptor, such that the vehicle operator perceives that there is spring tension or friction load on the control inceptor.

For example purposes only, vertical velocity and vertical position or altitude control is described below. The vehicle operator adjusts a vertical control inceptor, hereinafter referred to as a control inceptor, to maintain a desired altitude or vertical velocity. Of course, similar control is used for longitudinal, lateral or directional control of an aeronautical vehicle.

Generally, by adjusting the control inceptor in an upward direction causes a collective blade pitch to increase, thus causing the vehicle to climb. Alternatively, by adjusting the vertical controller in a downward direction causes the collective blade pitch to decrease, thus causing the vehicle to descend. The control inceptor position required to maintain a constant vertical velocity or constant altitude is a function of many factors such as vehicle velocity, acceleration, and atmospheric conditions.

Advanced vehicle control systems currently exist in the art for maintaining a specific vehicle state. For example, a vehicle may have an control system capable of maintaining, one of two vehicle states, either a constant vertical velocity or a constant altitude. The vehicle operator has an option of commanding the vehicle control system to maintain one vehicle state or the other, but not both concurrently. In order to transition between vehicle states the vehicle operator must perform one or both functions manually, or perform internal vehicle tasks, described in more detail below.

Referring now to FIG. 1, a traditional tactile cueing model diagram including a tactile cue representation with a dual spring constant and detent for a single vehicle state is shown. Traditionally, an control inceptor system controller defines parameters of the tactile cue representation such that first slopes 1, of curve 2, have a first spring constant and a second slope 3, has a second spring constant. The second slope 3 is associated with a detent 4 that is relatively higher in slope than the first slopes 1. The detent 4 has upper and lower detent limits 5 corresponding to slope changes between the first slopes 1 and the second slope 3. A detent center position 6, or zero velocity position $\delta_{c_{h\_0}}$, is commanded by a flight controller. For instance command of the detent position 6 can be continuously calculated by the flight controller as a position of the control inceptor, which corresponds to a constant altitude mode. When there is no force exerted on the control inceptor, by the vehicle operator, the control inceptor is adjusted by the flight controller to the detent position 6, sometimes referred to as a neutral position, and the vehicle maintains a constant altitude vehicle state. In order for a vehicle operator to command the vehicle to operate in a vehicle state other than constant altitude the vehicle operator needs to maintain a constant force on the control inceptor, thus maintaining the control inceptor at a position other than the position to maintain constant altitude.

Additionally, when the vehicle operator switches between vehicle states or vehicle operating modes or has a desire to maintain a different constant vehicle state, the vehicle operator is mentally and physically focusing on monitoring vehicle performance, turning a dial, flipping a switch, or performing some other internal vehicle actuation operation known in the art. The vehicle operator is therefore deterred from focusing on activity external to the vehicle, as in normal manual vehicle operation. The more internal vehicle tasks to perform, the higher a vehicle operator workload, and thus the higher the probability of a vehicle collision occurring and the fewer other tasks the vehicle operator can complete.

Furthermore, an aeronautical vehicle cockpit contains numerous vehicle actuators and operational controls including switches, dials, levers, controllers, monitors, and other actuators known in the art. The more actuators and operational controls, the more confusion during vehicle operation and the more costly the development and testing of a vehicle.

Consequently, a desire exists to provide a vehicle tactile cueing system that is capable of maintaining multiple vehicle states such as constant vertical velocity and constant altitude while minimizing vehicle operator workload and operating complexity. Moreover, the vehicle tactile cueing system should not increase but rather decrease the quantity of actuators and operation controls while increasing vehicle-handling qualities.

Also, it is desirable that a vehicle tactile cueing system operate in conjunction with existing vehicle control systems. For an aeronautical vehicle, relationships between a control inceptor position and corresponding vehicle response are control characteristics of the vehicle, which are carefully designed. Altering vehicle response characteristic can result in time consuming and costly testing of a vehicle and re-training of vehicle operators. Thus, a newly introduced vehicle tactile cueing system should not significantly alter this relationship.

SUMMARY OF THE INVENTION

The present invention provides a method and system for tactile cueing a vehicle operator as to control inceptor position for multiple vehicle states. A split detent tactile cueing vehicle control system for a vehicle is provided including an active control inceptor system. The active system includes a control inceptor having a plurality of positions and a position sensor that generates a control inceptor position signal. The system also includes a plurality of vehicle performance sensors that generate a plurality of vehicle performance signals. A flight controller is electrically coupled to the position sensor and the plurality of vehicle performance sensors, and generates a control inceptor actuation signal by applying a tactile cueing model and in response to the position signal and the plurality of vehicle performance signals. A method of performing the same is also provided.

The present invention has several advantages over existing tactical cueing systems. One advantage of the present invention is that it is capable of providing a vehicle operator tactile cues indicating control inceptor positions for more than one vehicle state including constant velocity and constant position.

Another advantage of the present invention is that it provides increased vehicle handling qualities with decreased vehicle operating complexity. Thus, the split detent tactile cueing vehicle control system decreases vehicle operator workload by decreasing the time the operator must spend performing in-vehicle tasks and increases the amount of time the vehicle operator focuses on activity outside the vehicle.

Furthermore, in combination with the aforementioned, the present invention provides a vehicle operator with operational ability to switch between vehicle states without any associated deterrences or distractions that are common in traditional tactile cueing vehicle control systems.

Moreover, the present invention is capable of operating in conjunction with existing vehicle systems and providing tactile cues to a vehicle operator via the control inceptor without altering existing relationships between control inceptor positions and corresponding vehicle responses.

The present invention itself, together with further objects and attendant advantages, will be best understood by reference to the following detailed description, taken in conjunction with the accompanying drawing.

DETAILED DESCRIPTION OF THE PREFERRED EMBODIMENT

While the present invention is described with respect to a method and system for tactile cueing a vehicle operator as to a tactile controller position for an aeronautical vehicle, the present invention may be adapted for various applications and systems including: aeronautical vehicles and systems, automotive vehicles and systems, control systems, tactical cueing systems, or other applications or systems known in the art. It is also understood that the present invention may be applied in controlling various types of propulsion systems or various types of blade control systems.

In the following description, various operating parameters and components are described for one constructed embodiment. These specific parameters and components are included as examples and are not meant to be limiting.

Figure 2:
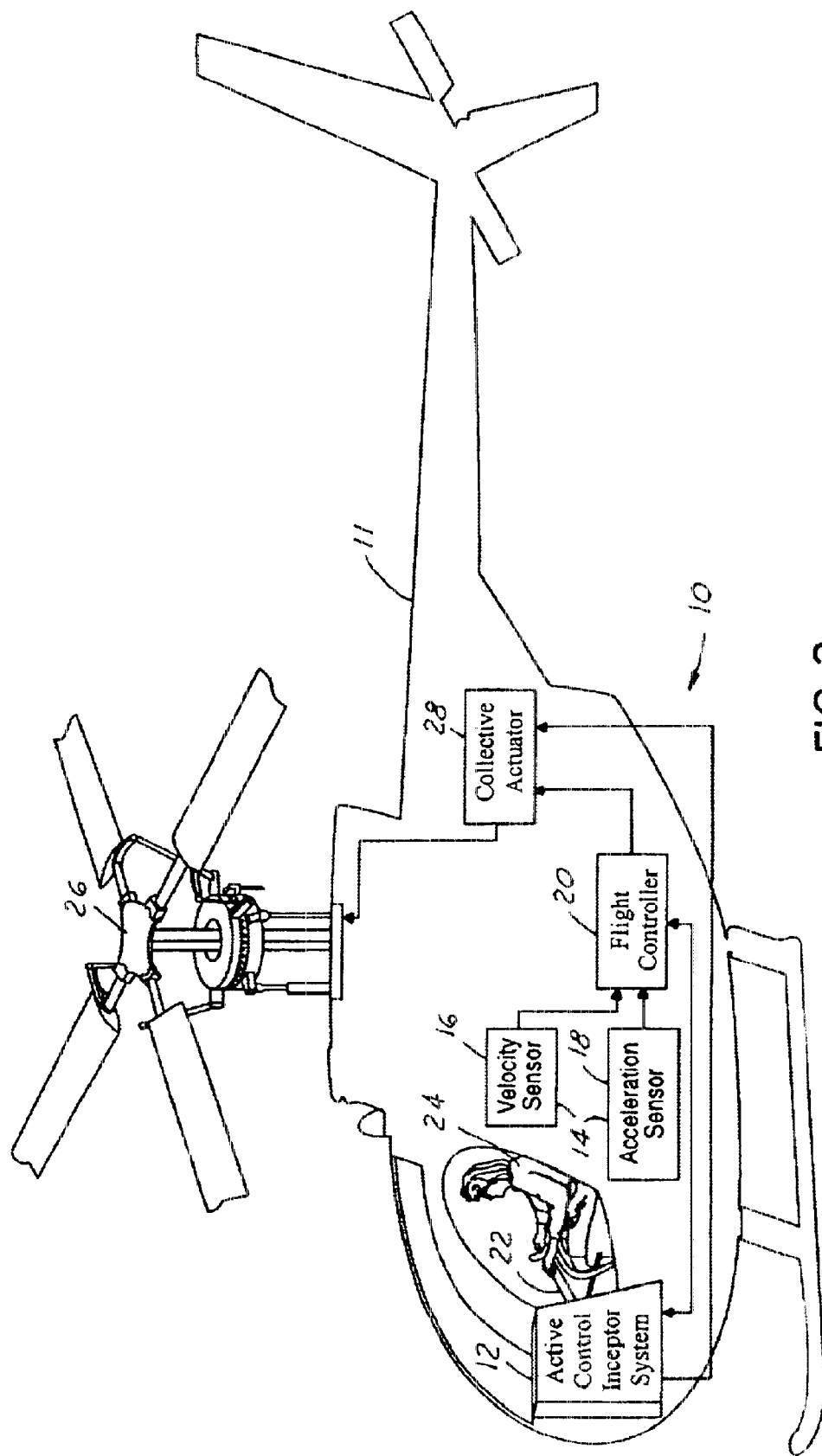
FIG. 2 is a schematic and block diagrammatic view of a split detent tactile cueing vehicle control system in accordance with an embodiment of the present invention.

Referring now to FIG. 2, a block diagrammatic view of a split detent tactile cueing vehicle control system 10 for an aeronautical vehicle 11 in accordance with an embodiment of the present invention is shown. The tactile cueing system 10 includes an active control inceptor system 12, and other vehicle performance sensors 14, for instance a velocity sensor 16, and an acceleration sensor 18, which are electrically coupled to a flight controller 20. The active control inceptor system 12 includes a control inceptor 22 having multiple positions. The vehicle performance sensors 14 may be of various type known in the art and may be in various locations on the vehicle 11. The flight controller 20 determines positions of the control inceptor 22 to maintain desired vehicle states of a vehicle operator 24 and tactile cues the operator 24, via the active system 12, using a tactile cueing model having various associated operating modes and corresponding tactile control inceptor positions.

The flight controller 20 upon determining a operating mode and a control inceptor position, adjusts pitch of a collective blade 26 via a collective actuator 28. The collective actuator 28 may be mechanically or electrically controlled by the flight controller 20 via a mechanical linkage or electronic circuitry, respectively, as known in the art. Vehicle state is altered by adjusting pitch of the collective blade 26.

Figure 1:
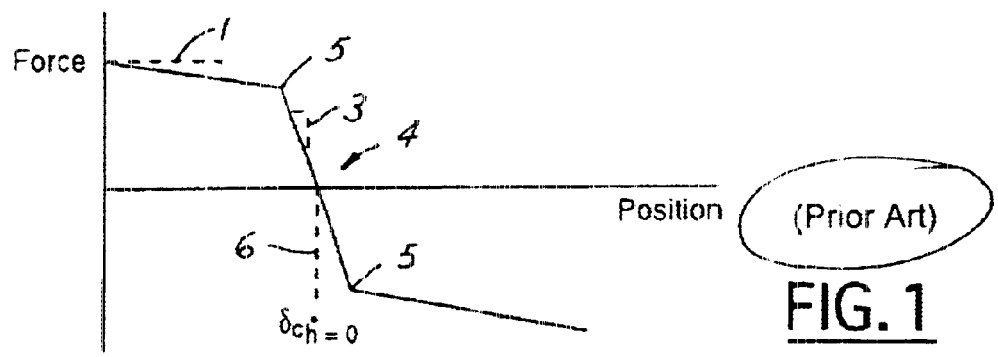
FIG. 1 is a tactile cueing model diagram for a traditional tactile cueing vehicle control system.
Figure 3:
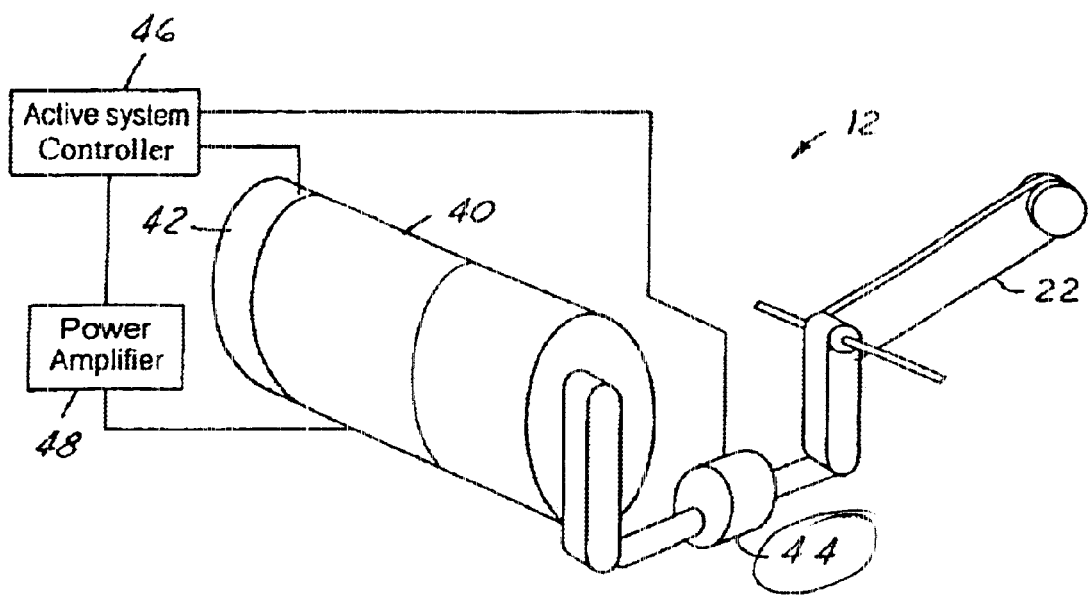
FIG. 3 is a schematic and block diagrammatic view of an active tactile control inceptor system in accordance with an embodiment of the present invention.

Referring now to FIG. 3, a block diagrammatic view of an active control inceptor system 12 in accordance with an embodiment of the present invention is shown. The active system 12 includes the control inceptor 22 mechanically coupled to an active control inceptor motor 40. The motor 40 may be replaced with a hydraulic and pneumatic device, a mechanical device, or other actuation device. A position sensor 42 and a force sensor 44 are coupled to the control inceptor 22 and an active system controller 46. The position sensor 42 determines position of the control inceptor 22 and generates a position signal. The active system controller 46 can be programmed with a tactile cue representation that is continuously modified by the flight controller 20. The active system controller 20 operates the motor 40 in response to the control inceptor position signal and a control inceptor force signal, generated by the force sensor 44, so as to position the control inceptor 22 in various positions and having various different active tactile controller system representations, hereinafter referred to as active representations.

The active representations are performed depending upon positioning of the tactical controller 20 and selected tactical cueing model modes. The active representations may correspond to the active system 12 performing as a spring constant, a ratchet, a lock, a detent, a latch, a split detent, or other representation known in the art.

Thus, the active system 12 may be used to adjust control inceptor tension, dampening or other control inceptor representation, such that the operator 24 perceives that spring tension or friction, or other more complex tactile cue representation exists on the control inceptor 22. The tactile cue representations aid the operator 24 by providing tactile cues to control inceptor positions for maintaining a vehicle operator desired vehicle state.

The flight controller 20 and the active system controller 46 are preferably microprocessor based such as a computer having a central processing unit, memory (RAM and/or ROM), and associated input and output buses. The controllers 20 and 46 may be a portion of a central vehicle main control unit, an interactive vehicle dynamics module, or may each be stand-alone controllers as shown.

Figure 4:
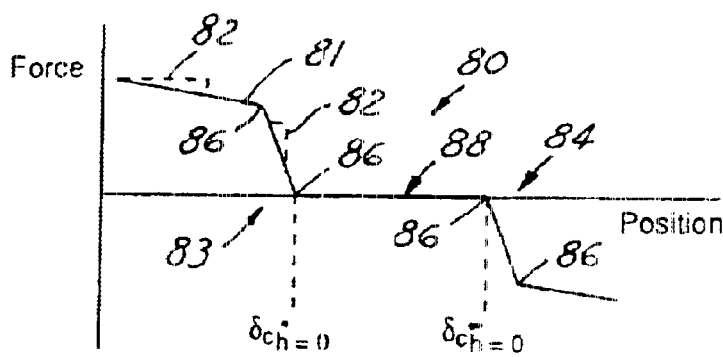
FIG. 4 is a tactile cueing model diagram illustrating a split detent in accordance with an embodiment of the present invention.

Referring now to FIG. 4, a tactile cueing model diagram illustrating a split detent 80 in accordance with an embodiment of the present invention is shown. The tactile cueing model diagram includes curve 81 having multiple slopes 82, corresponding to multiple spring constants. Since it is undesirable for the operator 24 to maintain a constant force to maintain a vehicle state, in addition to a current vehicle state, such as constant velocity when operating at constant position, the flight controller 20 determines a vehicle operator desired vehicle state and tactile cues to both the desired vehicle state and the current vehicle state. Each portion of the tactile cueing model diagram may be used to cue a unique vehicle state.

The tactile cueing model, for this embodiment, incorporates a split detent 80 having a first portion 83 and a second portion 84, each portion corresponds to a tactile cue for an independent vehicle state. For example, the first portion 83 has an associated first control inceptor position that corresponds to a constant velocity mode, denoted by $\delta_{c_{\dot{h}=0}}$, and the second portion 84 has an associated second control inceptor position that corresponds to a constant position mode, denoted by $\delta_{c_{h=0}}$.

The operator 22 may hold the control inceptor 22 at a constant position corresponding to the constant position mode $\delta_{c_{h=0}}$ or the constant velocity mode $\delta_{c_{\dot{h}=0}}$, respectively, for a predetermined period of time so as to command the flight controller 20 to operate in a constant position mode or a constant velocity mode.

Each of the detent portions 83 and 84 has associated upper or lower detent limits 86. The first detent portion 83 and the second detent portion 84 may be separated by a friction area 88 or other area having a tactile characteristic. The operator 24 may adjust the control inceptor 22 to a position corresponding to either detent portion 83 or 84 to command the vehicle 11 to operate in one of two vehicle states or in a combination thereof. The operator 24 is able to distinguish between operating in a constant position mode or a constant velocity mode by a difference in control inceptor position, represented by the friction area 88.

The flight controller 20 continuously determines a control inceptor position for both vehicle states and signals the active system controller 46 to modify the tactile cueing model to maintain the vehicle states. For example, the flight controller 20 may shift the tactile cueing model to compensate for control inceptor position adjustment and to align the detent portion 83 and 84, accordingly. When the vehicle is operating in constant velocity mode, in order to also operate in constant position mode, the operator 24 adjusts position of the control inceptor 22 over a position range corresponding to the friction area 88 to the second detent portion 84. The control inceptor representations correspond with tactile cues from which the operator 24 is able to determine whether the control inceptor 22 has been adjusted to an appropriate position for a particular vehicle state, without the operator 24 monitoring vehicle performance displays or diverting attention to other internal vehicle tasks, as with traditional vehicle tactile cueing systems.

The operator 24 may terminate the constant position mode or the constant velocity mode by adjusting position of the control inceptor 22 beyond a breakout position and by applying a force larger than a breakout force corresponding to respective upper and lower detent limits 86.

Note that the tactile cueing representations of the present invention are dynamic in that the flight controller 20 adjusts tactile cueing model parameters, such as detent position, positions of the detent portions 83 and 84, the size of the friction area 88, shape, slope, detent limit values, and other tactical cueing model parameters known in the art. In so doing, the tactile cueing model is continuously being adjusted for multiple vehicle states and operating situations.

Figure 5:
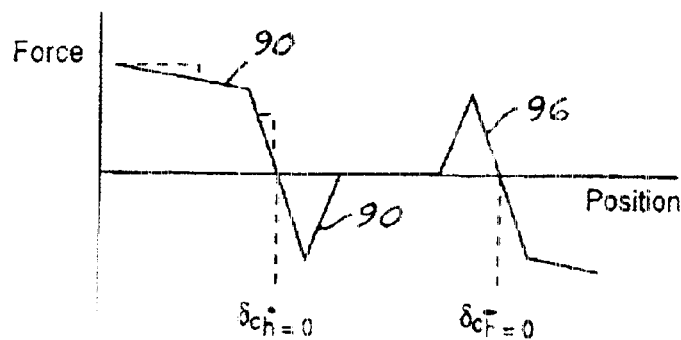
FIG. 5 is a tactile cueing model diagram illustrating a split detent incorporating latches in accordance with an embodiment of the present invention.

Referring now to FIG. 5 a tactile cueing model diagram illustrating a split detent incorporating latches in accordance with an embodiment of the present invention is shown. Curve 90, also represents a tactile cueing model, for another embodiment of the present invention. Curve 90 is similar to curve 81 of FIG. 4, but also includes a pair of latches 96. The latches 96 provide a positive maintaining characteristic to compensate for internal or external disturbances, generating a vehicle external signal that may cause a tactile cueing model to be altered by the flight controller 20. For example, when the tactile cueing system 10 is operating in a constant velocity mode and the vehicle 11 experiences a vehicle external signal, such as a disturbance or a large wind gust, the flight controller 20 shifts the appropriate tactile cueing model as to compensate for the wind gust disturbance and maintains constant set velocity. The latches 96 aids in ensuring that the control inceptor 22 is adjusted in a direction corresponding with a shifted portion of the split detent 80. Of course, the tactile cueing model may be adjusted differently than stated above, by performing other tactile cueing model adjustments, such as changing slopes or shape of the curve 90, repositioning detent portions, or by performing some other tactile cueing adjustment known in the art.

Figure 6:
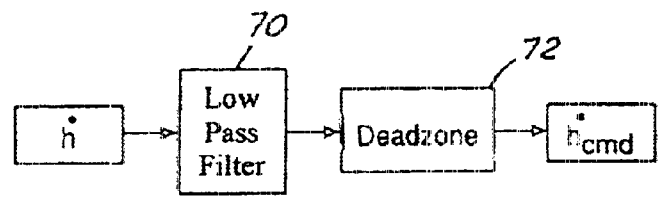
FIG. 6 is a signal flow diagram illustrating calculation of a commanded vehicle state in accordance with an embodiment of the present invention.

Referring now to FIG. 6, a signal flow diagram illustrating calculation of a commanded vehicle state in accordance with an embodiment of the present invention is shown. Measured vehicle velocity is represented by $\dot{h}$ and a constant velocity command signal is represented by $\dot{h}_{cmd}$. The flight controller 20 in determining whether to operate in a constant velocity mode utilizes a low pass filter 70 and a deadzone 72. The low pass filter 70 and the deadzone 72 may be software or hardware devices within the flight controller 20 or may be external and separate from the flight controller 20.

The low pass filter 70 provides a delay so that a velocity command, received from the operator 24 via the control inceptor 22, is converted by the flight controller 20 into steady velocity command values and does not respond to rapid and transient velocity commands. The low pass filter 70 may be represented in the Laplace transfer function of $1/(ts+1)$.

The deadzone 72 is used to prevent the tactile cueing system 10 from performing a constant velocity mode with relatively small velocities that may not be detected by the operator 24, thus, preventing the vehicle 11 from drifting when the operator 24 is attempting to hold a constant position and is not. The flight controller 20 determines that the operator 24 is commanding a constant velocity mode that is for a small velocity and the flight controller continues to operate in a constant position mode.

In order to prevent a commanded vehicle state from drifting, the flight controller 20 may not adjust a current control inceptor position when the current control inceptor position is near an appropriate control inceptor position as to maintain the commanded vehicle state, which may occur when the operator 24 is not exerting force on the control inceptor 22.

Thus, a commanded vehicle state follows a current vehicle state with a slight delay. The operator 24 may command the vehicle 11 to operate in a second vehicle state, when the vehicle 11 is operating in a first vehicle state, and the flight controller upon detecting the commanded second vehicle state adjusts vehicle performance, accordingly.

Figure 7:
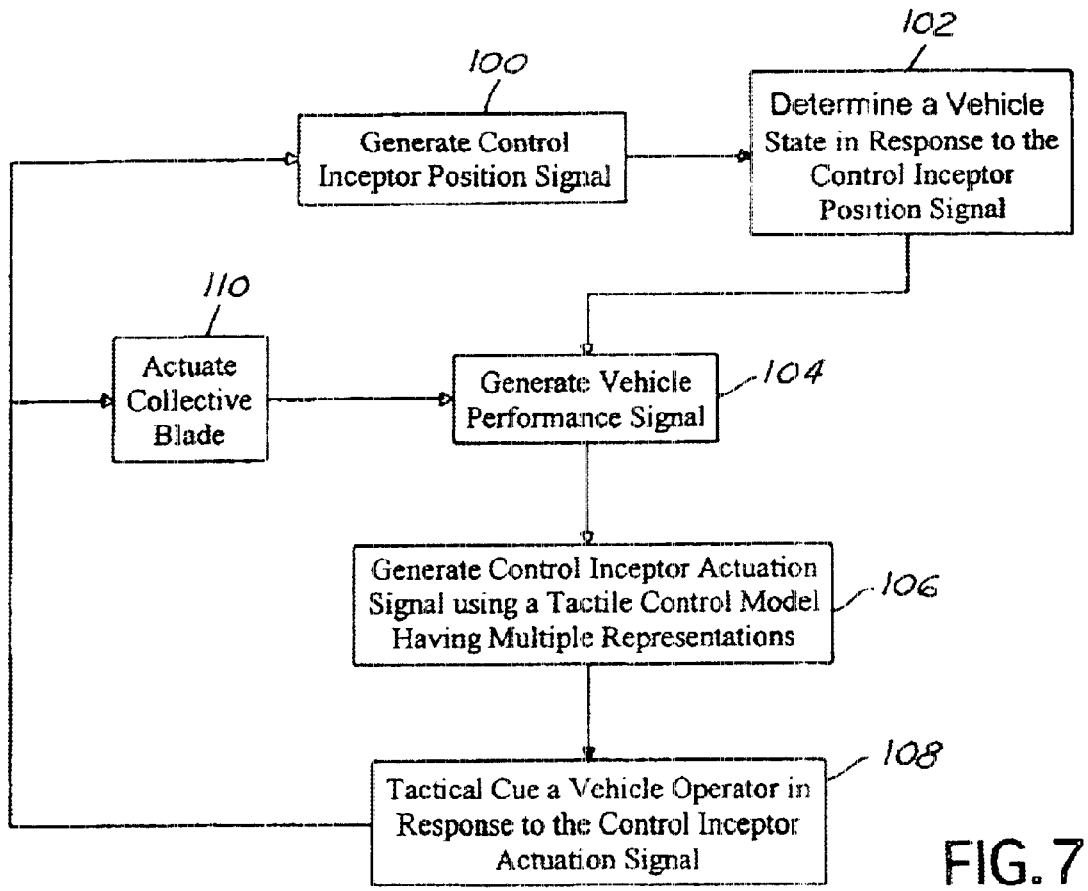
FIG. 7 is a logic flow diagram illustrating a method of tactile cueing within the split detent tactile cueing vehicle control system in accordance with an embodiment of the present invention.

Referring now to FIG. 7, a logic flow diagram illustrating a method of tactile cueing within the tactile cueing system 10 in accordance with an embodiment of the present invention is shown.

In step 100, the position sensor 42 generates a control inceptor position signal. The control inceptor position signal is continuously monitored by the flight controller 20. The control inceptor position signal may be manually adjusted by the operator 24 or may be adjusted by the tactical cueing system 10.

In step 102, the flight controller 20 determines a vehicle operator desired vehicle state by comparing the control inceptor position signal with a control inceptor position corresponding to a current vehicle state. The difference in control inceptor positions corresponding to the vehicle operator desired vehicle state and the current vehicle state may be used by the flight controller 20 to determine when to update the current vehicle state.

In step 104, the vehicle performance sensors 14 generate vehicle performance signals. For example, the velocity sensor 16 generates a vehicle velocity signal, corresponding to a traveling velocity of the vehicle 11 in either a vertical direction, a horizontal direction, or a combination thereof. The acceleration sensor 18 generates a vehicle acceleration signal, corresponding to a current acceleration of the vehicle 11 in a vertical direction, horizontal direction, or a combination thereof.

In step 106, the flight controller 20 updates a current vehicle state when appropriate, as determined in step 102. The flight controller 20 generates a control inceptor actuation signal by applying a tactile cueing model and in response to the control inceptor position signal and the vehicle performance signals. As stated above the tactile cueing model includes multiple active representations. The flight controller 20 may determine whether to operate the vehicle 11 in a constant velocity mode, a constant position mode, a normal operating mode, or other operating mode known in the art. The normal operating mode, referring to the vehicle 11 being operated manually while the tactile cueing system 10 continuing to tactile cue the operator 24 of tactile controller positions. The flight controller may also calculate the control inceptor positions to maintain desired vehicle states. For maintaining constant position equations 1 and 2 may be utilized and for maintaining constant velocity equation 3 may be utilized:

$$\delta_{c_{\dot{h}=0}} = \theta_0 - \dot{h}\frac{Z_w}{Z_{\theta_0}} - \ddot{h}\frac{1}{Z_{\theta_0}} \quad (1)$$

$$\theta_{0_{\dot{h}=0}} = G_\theta^{-1} \theta_{0_{\dot{h}=0}} \quad (2)$$

$$\delta_{c_{\dot{h}=0}} = \dot{h}_{cmd}\left(\frac{\partial \dot{h}}{\partial \delta_c}\right)^{-1} + \delta_{c_{\dot{h}=0}} \quad (3)$$

where control inceptor position is represented by $\delta_c$, a known conversion equation is represented by $G_\theta$, collective blade pitch position is represented by $\theta_{0_{\dot{h}=0}}$, $Z_w$ is inherent vertical bandwidth, and $Z_{\theta_0}$ is vertical control derivative. When the flight controller 20 determines to operate the vehicle 11 in constant velocity mode the flight controller signals the active system controller 46 to split a current detent to create the split detent, of FIG. 4 or 5.

In step 108, the flight controller 20 tactile cues the operator 24 in response to the control inceptor actuation signal. The active system controller 46 receives the control inceptor actuation signal and adjusts control inceptor positioning and tactile cueing representations within a currently applied tactile cueing model, accordingly.

Upon completion of step 108, the flight controller 20 adjusts pitch of the collective blade 26 via the collective actuator 28, as generally indicated by step 110, and returns to step 100. The adjustment to collective blade pitch alters vehicle performance. The resulting change in vehicle performance is then detected by the vehicle performance sensors 14, in step 104.

The above-described steps are meant to be an illustrative example, the steps may be performed synchronously or in a different order depending upon the application. Also, the above-described steps illustrate an example for constant velocity and constant position, of course other vehicle dynamic attributes may be applied using the present invention.

The present invention therefore provides a tactile cueing vehicle control system that allows a vehicle operator to position the control inceptor position to maintain desired vehicle states. The present invention improves vehicle-handling qualities by adjusting control inceptors to maintain the desired vehicle states, and allowing the vehicle operator to select different vehicle states without above stated deterrences or distractions.

The above-described apparatus and method, to one skilled in the art, is capable of being adapted for various applications and systems including: aeronautical vehicles and systems, automotive vehicles and systems, control systems, tactical cueing systems, or other applications or systems known in the art. The above-described invention can also be varied without deviating from the true scope of the invention.

What is claimed is:

1. A split detent tactile cueing vehicle control system for a vehicle comprising:
   an active control inceptor system comprising:
      a control inceptor having a plurality of positions; and
      a position sensor coupled to said control inceptor and generating a control inceptor position signal;
   a plurality of vehicle performance sensors generating a plurality of vehicle performance signals; and
   a flight controller electrically coupled to said position sensor and said plurality of performance sensors, and generating a control inceptor actuation signal by applying a tactile cueing model comprising a split detent and in response to said control inceptor position signal and said plurality of vehicle performance signals.

2. A system as in claim 1 wherein said split detent comprises:
   a first portion corresponding to a first control inceptor representation and a first vehicle state; and
   a second portion corresponding to a second control inceptor representation and a second vehicle state.

3. A system as in claim 1 wherein said flight controller in generating a control inceptor actuation signal tactile cues a vehicle operator of a plurality of control inceptor positions corresponding to a plurality of vehicle states.

4. A system as in claim 1 wherein said plurality of vehicle performance sensors comprise a vehicle velocity sensor and a vehicle acceleration sensor.

5. A system as in claim 1 wherein said flight controller in generating a control inceptor actuation signal applies a tactile cueing model comprising a plurality of control inceptor representations.

6. A system as in claim 1 wherein said flight controller in generating a control inceptor actuation signal determines whether to operate the vehicle in a mode that is selected from at least one of constant velocity mode, a constant position mode, and a normal operating mode.

7. A system as in claim 6 wherein said flight controller in operating the vehicle in a constant velocity mode continuously monitors said position sensor and said plurality of performance sensors and generates said control inceptor actuation signal in response to said control inceptor position signal and said plurality of vehicle performance signals to maintain propulsion of the vehicle at a constant velocity.

8. A system as in claim 6 wherein said flight controller in operating the vehicle in a constant position mode continuously monitors said position sensor and said plurality of vehicle performance sensors and generates said control inceptor actuation signal in response to said control inceptor position signal and said plurality of vehicle performance signals to maintain the vehicle at a constant position.

9. A system as in claim 6 wherein said flight controller operates the vehicle in said constant velocity mode when said control inceptor position signal is above a predetermined position level for a predetermined duration of time.

10. A system as in claim 6 wherein said flight controller operates the vehicle in said constant position mode when said control inceptor position signal is within a predetermined position range for a predetermined duration of time.

11. A system as in claim 1 wherein said flight controller in generating said tactile control inceptor actuation signal incorporates at least one latch in said tactile cueing model.

12. A system as in claim 1 wherein said flight controller in generating a control inceptor actuation signal maintains a current vehicle state.

13. A system as in claim 12 wherein said flight controller maintains a current vehicle state in response to an external vehicle signal.

14. A split detent tactile cueing vehicle control system for a vehicle comprising:
 an active control inceptor system comprising:
  a control inceptor having a plurality of positions; and
  a position sensor coupled to said control inceptor and generating a control inceptor position signal;
 a velocity sensor generating a vehicle velocity signal;
 an acceleration sensor generating a vehicle acceleration signal; and
 a flight controller electrically coupled to said position sensor, said velocity sensor, and said acceleration sensor, and generating a control inceptor actuation signal by applying a tactile cueing model comprising a split detent and in response to said control inceptor position signal, said vehicle velocity signal, and said vehicle acceleration signal;
 said tactile cueing model comprising a plurality of tactile control inceptor representations selected from at least one of a spring constant, a ratchet, a lock, a detent, a latch, and a split detent.

15. A method of tactile cueing within a split detent tactile cueing vehicle control system of a vehicle comprising;
 generating a control inceptor position signal;
 generating a plurality of vehicle performance signals; and
 generating a control inceptor actuation signal by applying a tactile cueing model comprising a split detent and in response to said control inceptor position signal and said plurality of vehicle performance signals.

16. A method as in claim 15 wherein applying a tactile cueing model comprising a split detent comprises applying a split detent comprising:
 a first portion corresponding to a first control inceptor representation and a first vehicle state; and
 a second portion corresponding to a second control inceptor representation and a second vehicle state.

17. A method as in claim 15 wherein in generating a control inceptor actuation signal by applying a tactile cueing model comprises a plurality of active control inceptor representations.

18. A method as in claim 15 wherein in generating a tactile control inceptor actuation signal comprises determining whether to operate the vehicle in a mode that is selected from at least one of a constant velocity mode, a constant position mode, and a normal operating mode.

19. A method as in claim 18 wherein determining whether to operate the vehicle in said constant velocity mode comprises operating in said constant velocity mode until said control inceptor position signal is above a predetermined position level for a predetermined duration of time.

20. A method as in claim 18 wherein determining whether to operate the vehicle in said constant position mode comprises operating in said constant position mode when said control inceptor position signal is within a predetermined position range for a predetermined duration of time.

* * * * *

UNITED STATES PATENT AND TRADEMARK OFFICE
CERTIFICATE OF CORRECTION

| | | |
|---|---|---|
| PATENT NO. | : 6,679,458 B2 | Page 1 of 1 |
| APPLICATION NO. | : 10/166796 | |
| DATED | : January 20, 2004 | |
| INVENTOR(S) | : Pieter G. Einthoven and David G. Miller | |

It is certified that error appears in the above-identified patent and that said Letters Patent is hereby corrected as shown below:

In the specification:

Please insert the following above the paragraph entitled "TECHNICAL FIELD."

--GOVERNMENT CONTRACT

This invention was made with Government support under Contract No. DAAH10-00-C-0052. The Government has certain rights in this invention.--

Signed and Sealed this
Twenty-ninth Day of December, 2015

Michelle K. Lee
*Director of the United States Patent and Trademark Office*